(12) United States Patent
Tupman

(10) Patent No.: US 8,041,968 B2
(45) Date of Patent: Oct. 18, 2011

(54) POWER MANAGEMENT FOR DRIVING DISPLAY WITH BASEBAND PORTION WHEN APPLICATION PORTION IS IN LOW POWER MODE

(75) Inventor: David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1141 days.

(21) Appl. No.: 11/650,073

(22) Filed: Jan. 4, 2007

(65) Prior Publication Data

US 2008/0168286 A1   Jul. 10, 2008

(51) Int. Cl.
*G06F 1/32* (2006.01)
(52) U.S. Cl. ............ 713/320; 455/343.1; 455/574
(58) Field of Classification Search ............. 713/320; 455/343.1, 574
See application file for complete search history.

(56) References Cited

U.S. PATENT DOCUMENTS

| | | | |
|---|---|---|---|
| 6,909,434 B2 * | 6/2005 | Takala et al. | 345/537 |
| 7,640,041 B2 * | 12/2009 | Ragan | 455/572 |
| 2005/0068254 A1 * | 3/2005 | Booth | 345/3.3 |
| 2007/0123314 A1 * | 5/2007 | Ragan | 455/572 |

* cited by examiner

*Primary Examiner* — Albert Wang
(74) *Attorney, Agent, or Firm* — David C. Kellogg

(57) ABSTRACT

Systems and methods for efficiently managing power consumption in portable electronic devices are provided. In one embodiment, power management circuitry may operate the device in a low power mode (e.g., a HIBERNATION mode), but enables the device to quickly become fully operational in response to a power-ON event, despite having been in that low power mode. This may be accomplished by powering a processor engaging memory (e.g., SDRAM) while other circuitry are powered OFF. In another embodiment, the display may be driven by an application portion when operating in an ON mode, but may be driven by a carrier portion when the application is operating in a low power mode. In another embodiment, various discrete circuitry portions are selectively turned ON and OFF, depending, for example, on whether a particular discrete circuitry portion is idle or its processing functionality is not needed.

6 Claims, 15 Drawing Sheets

Application Portion

| Carrier Portion | Off | Deep Sleep | Sleep | Hibernate | On |
|---|---|---|---|---|---|
| Off | ✓ | ✓ | ✓ | ✓ | ✓ |
| Sleep | ✗ | ✗ | ✓ | ✓ | ✓ |
| On | ✗ | ✗ | ✗ | ✗ | ✓ |

FIG. 5

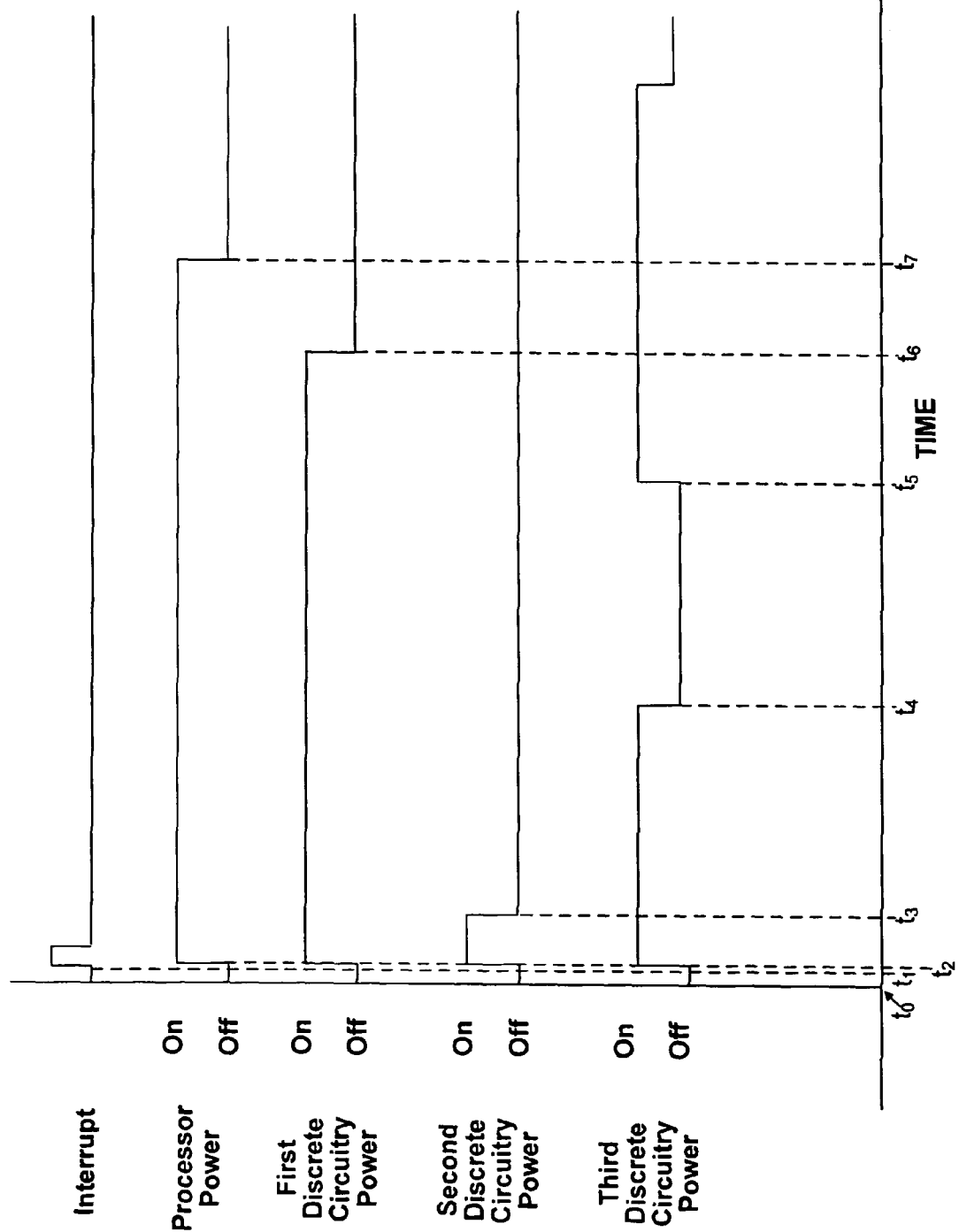

POWER MANAGEMENT FOR DRIVING DISPLAY WITH BASEBAND PORTION WHEN APPLICATION PORTION IS IN LOW POWER MODE

BACKGROUND OF THE INVENTION

This relates to electronic devices and more particularly to power management methods and systems.

Portable electronic devices, such as wireless and cellular telephones, digital media players (e.g., music players and video players), and hybrid devices that combine telephone and media playing functionality are known. These devices are typically powered by one or more batteries.

Batteries store a fixed amount of energy. Therefore, efficient use of the fixed energy source may be required to ensure the media device can operate for at least a predetermined amount of time, before being replaced or recharged. Thus, a need for efficient power management has become increasingly important, especially given the trend in miniaturization (and corresponding decrease in battery energy storage capacity), coupled with a demand for providing more power consuming features (e.g., devices providing both media playing and telephone functionality, as well as relatively large color display screens).

Accordingly, what is needed are power management methods and systems for efficiently managing power consumption in portable electronic devices, including media devices.

SUMMARY OF THE INVENTION

Systems and methods for efficiently managing power consumption in portable electronic, such as those that include media playing and telephone functionality, are provided.

In one embodiment, power management may be implemented in a device including an application portion and a carrier portion. The carrier portion can include circuitry for performing telephone functions (e.g., transmitting data to and receiving data from a communications tower). The carrier circuitry can include circuitry for other wireless communication functions, such as to enable Bluetooth and Wi-Fi communication methods. The application portion may include all other circuitry not specifically reserved for the carrier circuitry. For example, the application portion may include a processor, memory (e.g., for storing media files), SDRAM, a display, and other circuitry.

The application and carrier portions may each operate according to predetermined power modes. For example, the application portion may operate according to an OFF mode, a DEEP SLEEP mode, a SLEEP mode, a HIBERNATE mode, and an ON mode. The carrier portion may operate according to an OFF mode, a SLEEP mode, and an ON mode. Depending on which mode the application portion, the carrier portion, or the combination of both portions is operating in, power management circuitry can use an appropriate power management scheme to conserve power.

In one embodiment of a power management scheme according to the invention, the power management circuitry may operate in a low power mode (e.g., a HIBERNATION mode), but enable the device to quickly become fully operational in response to a power-ON event (e.g., an event that causes the media device to switch from a low power mode to an ON mode). To provide the combined benefit of both low power consumption and quick operational readiness, a processor engaging memory (e.g., SDRAM) may be powered ON while other circuitry in the application portion and the carrier portion are powered OFF. By keeping the processor engaging memory powered ON, a time delay in powering up that memory can be avoided when the device switches from a low power mode to an ON mode. This can enable the memory to substantially immediately load its contents into the processor. When the processor receives the memory contents, the media device may be fully operational.

When the media device is in the low power mode, both the application and carrier portions may be in a low power mode. The power management circuitry may periodically activate the carrier portion (or predetermined circuitry within the carrier portion) to enable it to, for example, determine whether an incoming signal (e.g., telephone call or text message) is being received. If an incoming signal is being received, this may trigger a power-ON event that causes the power management circuitry to switch the media device from a low power mode to an ON mode. If no incoming signal is detected, the power management circuitry may deactivate the carrier portion, allowing it to return to a low power mode.

Power management may coordinate power management across both portions of the personal media device. This provides extra flexibility in managing power consumption. For example, independent mode control may be exercised for the application portion and the carrier portion. That is, when the application portion is operating in a particular mode (e.g., ON mode), the power management circuitry may select one of several available modes (e.g., OFF, SLEEP, and ON) for the carrier circuitry. The available modes may depend on the operating mode of the application portion.

Power management may also be used to control how content is displayed on a display screen of the personal media device. For example, when the application portion is operating in an ON mode, the processor may drive the display. However, when the application portion is operating in a low power mode, the carrier portion may drive the display. The carrier portion may write data to memory local to the display during the SLEEP mode interval (e.g., once every second). The data stored in the local memory may then be displayed on the display. Power savings may be realized using the carrier portion to drive the display when the device is operating in a low power mode because the carrier portion does not require processor activation, which may require more power than the carrier portion to drive the display.

Power management may also be used to reduce power consumption when the device is operating in an ON mode. For example, various discrete circuitry portions can be selectively turned ON and OFF, depending, for example, on whether a particular discrete circuitry portion is idle or its processing functionality is not needed. The discrete circuitry portions may be turned ON and OFF by electrically coupling and de-coupling the circuitry portion to a power supply via a controlled switch. When a discrete circuitry portion is not needed, the supply of power is cut off, thereby preventing power loss caused by leakage current.

In one embodiment, the switch may be controlled by interrupt control circuitry and/or by the processor. The interrupt control circuitry may be operative to cause a switch to close, thereby electrically coupling the discrete circuitry portion associated with that switch to the power supply. When the processor is turned OFF and the processor is needed to perform a function, the interrupt circuitry may cause the processor switch to close to enable power to be delivered to the processor. When the processor is ON, it may monitor itself and other discrete circuitry portions to determine whether to turn itself or those portions OFF. If the discrete circuitry portion is not needed (e.g., idling), the process may provide an instruction that causes a switch associated with that portion to electrically de-couple the supplied power from that portion. In addition, the processor may provide instructions to cause a switch to electrically couple a discrete circuitry portion to the power supply.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which:

FIG. 5 shows a power management coordination table in accordance with an embodiment of the present invention;

FIG. 15 is an illustrative timing diagram showing the ON/OFF states of a processor and first, second and third discrete circuitry in accordance with an embodiment of the present invention.

DETAILED DESCRIPTION OF THE INVENTION

Figure 1:
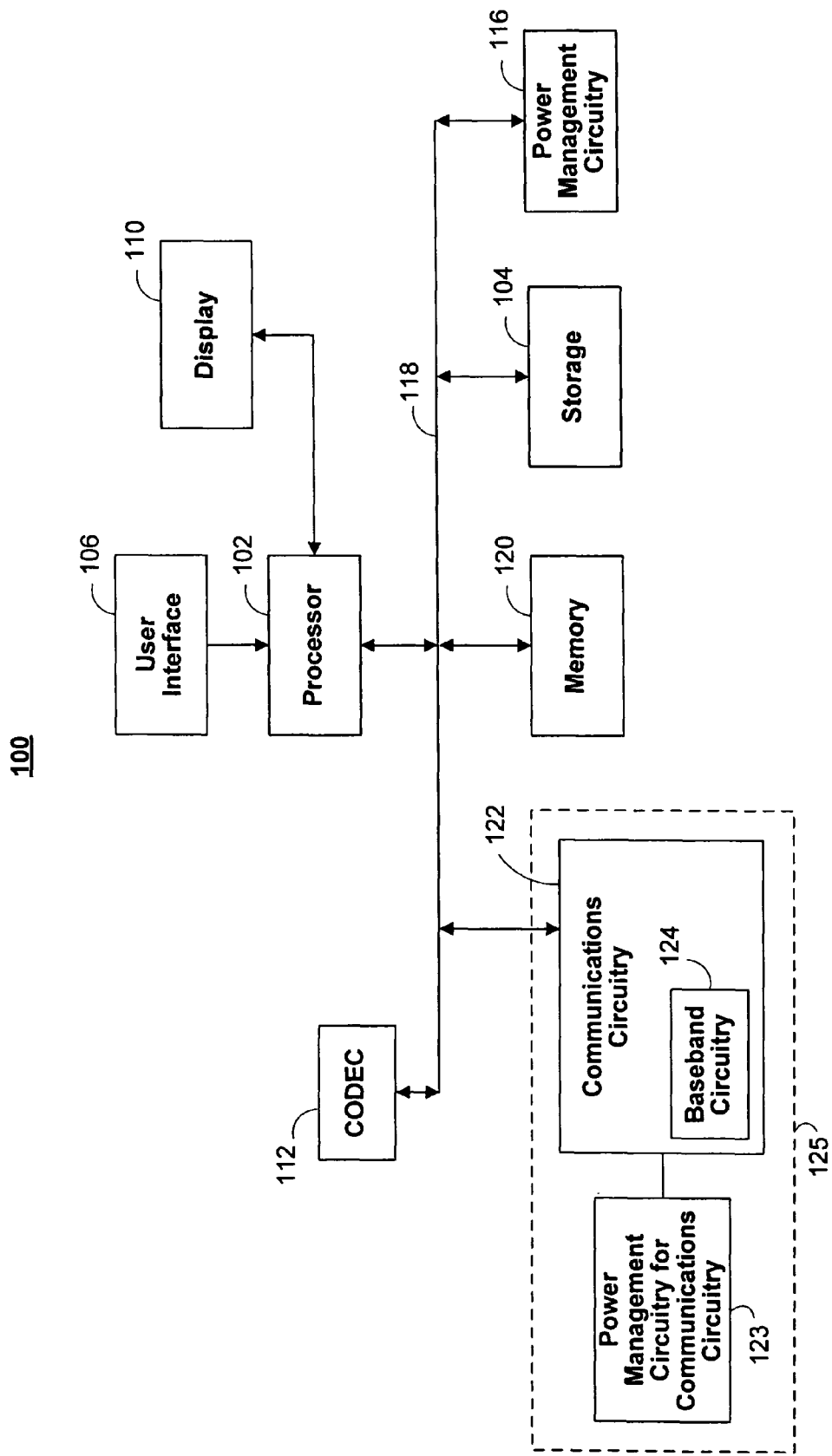
FIG. 1 shows a simplified block diagram of portable electronic device in accordance with an embodiment of the present invention.

FIG. 1 shows a simplified block diagram of illustrative portable media player 100. Media player 100 may include processor 102, storage device 104, user interface 108, display 110, CODEC 112, power management circuitry 116, bus 118, memory 120, communications circuitry 122, and power management circuitry for communications circuitry 123. Processor 102 can control the operation of many functions and other circuitry included in media player 100. Processor 102 may drive display 110 and may receive user inputs from user interface 108.

Storage device 104 may store media (e.g., music and video files), software (e.g., for implementing functions on device 100, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device to establish a wireless connection such as a telephone connection), subscription information (e.g., information that keeps tracks of podcasts or television shows or other media a user subscribes to), telephone information (e.g., telephone numbers), and any other suitable data. Storage device 104 may include one more storage mediums, including for example, a hard-drive, permanent memory such as ROM, semi-permanent memory such as RAM, or cache.

Memory 120 may include one or more different types of memory which may be used for performing device functions. For example, memory 120 may include cache, Flash, ROM, and/or RAM. Memory may be specifically dedicated to storing firmware. For example, memory may be provided for store firmware for device applications (e.g., operating system, user interface functions, and processor functions).

Power management circuitry 116 may be provided for controlling power management schemes in accordance with the principles of the present invention. Power management circuitry 116 may communicate with other circuitry in device 100 directly (not shown in this FIG., but shown in FIG. 2) or indirectly via bus 118.

Bus 118 may provide a data transfer path for transferring data to, from, or between storage device 104, power management circuitry 116, communications circuitry 123, baseband circuitry 124, memory 120, and processor 102. Coder/decoder (CODEC) 112 may be included to convert digital audio signals into an analog signal, which may be provided to an output port (not shown).

Communications circuitry 122 may be included in a carrier circuitry portion (delimited by dashed lines 125) of device 100. Carrier circuitry portion 125 may be dedicated primarily to processing telephone functions and other wireless communications (e.g., Wi-Fi or Bluetooth). In addition, power management of carrier circuitry portion 125 may be controlled by power management circuitry 116 and/or power management circuitry 123, which may be dedicated specifically to communications circuitry 122. It is understood that the carrier circuitry portion operate independent of other device components operating in device 100. That is, carrier circuitry may be an independently operating subsystem within device 100 that may communicate with other components within device 100.

User interface 108 may allow a user to interact with the player 100. For example, the user input device 108 can take a variety of forms, such as a button, keypad, dial, a click wheel, or a touch screen. Communications circuitry 122 may include circuitry for wireless communication (e.g., short-range and/or long range communication). For example, the wireless communication circuitry may be wi-fi enabling circuitry that permits wireless communication according to one of the 802.11 standards or a private network. Other wireless network protocols standards could also be used, either in alternative to the identified protocols or in addition to the identified protocol. Another network standard may be Bluetooth.

Communications circuitry 122 may also include circuitry that enables device 100 to be electrically coupled to another device (e.g., a computer or an accessory device) and communicate with that other device. As indicated above, communications circuitry 122 may also include baseband circuitry for performing relatively long-range communications (e.g., telephone communications). If desired, communications circuitry 122 may include circuitry for supporting both relatively long-range and short-range communications. For example, communications circuitry 122 may support telephone, Wi-Fi, and Bluetooth communications.

In one embodiment, player 100 may be a portable computing device dedicated to processing media, such as audio and video. For example, device 100 may be a media player (e.g., MP3 player), a game player, a remote controller, a portable communication device, a remote ordering interface, an audio tour player, or other suitable personal device. In another embodiment, player 100 may be a portable device dedicated to providing media processing and telephone functionality in single integrated unit. Device 100 may be battery-operated and highly portable so as to allow a user to listen to music, play games or video, record video or take pictures, place and take telephone calls, communicate with others, control other devices, and any combination thereof. In addition, device 100 may be sized such that is fits relatively easily into a pocket or hand of the user. By being handheld, device 100 is relatively small and easily handled and utilized by its user and thus may be taken practically anywhere the user travels.

Figure 2:
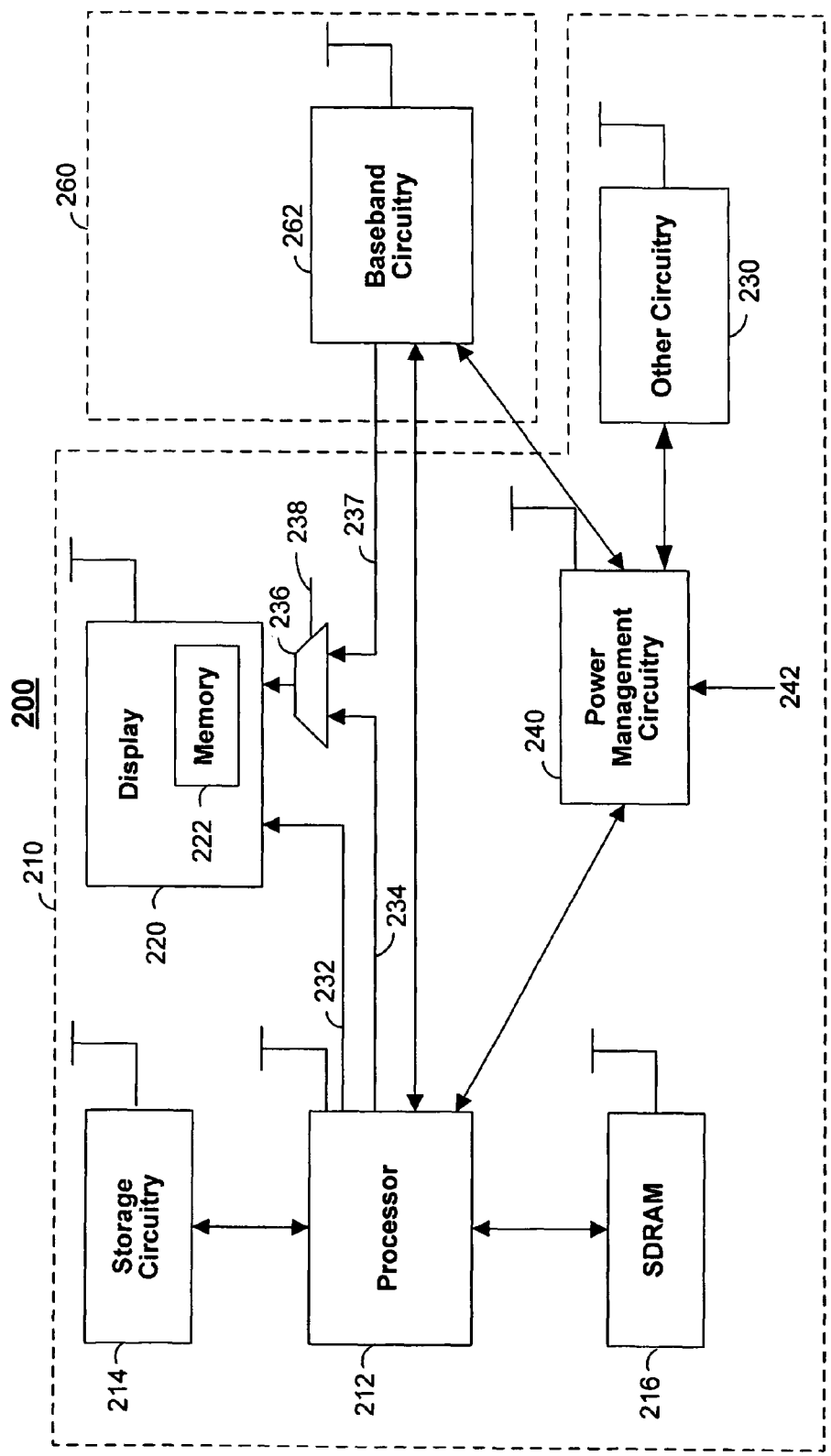
FIG. 2 is a more detailed but simplified block diagram of a device in accordance with an embodiment of the present invention.

FIG. 2 is a more detailed but simplified block diagram of illustrative device 200. Device 200 may be a mobile telephone. FIG. 2 shows illustrative application circuitry portion 210 and carrier circuitry portion 260. Carrier portion 260 can include circuitry for performing telephone functions (e.g., transmitting data to and receiving data from a communications tower), such as baseband circuitry 262. Carrier circuitry 260 may also include circuitry (not shown) for other wireless communication functions such as Bluetooth and Wi-Fi.

Application portion 210 may include all other circuitry not specifically reserved for carrier portion 260. For example, application portion 210 may include processor 212, storage circuitry 214 (e.g., for storing media files), SDRAM 216, a display 220, and other circuitry, which is collectively represented by box 230. Application portion 210 may also include power management circuitry 240 in accordance with the principles of the present invention. Power management circuitry 240 may generically represent circuitry for controlling power management of application portion 210 and carrier portion 260. Power management circuitry 240 may operate in conjunction with carrier power management circuitry (not shown) of carrier portion 260 when implementing power managing schemes in accordance with the invention.

Storage circuitry 214 may be similar to storage circuitry 104 discussed above in connection with FIG. 1. SDRAM 216 may provide content (e.g., instructions) to processor 212 that may enable processor 212 to execute functions of device 200. In certain circumstances, SDRAM 216 may "engage" or "prep" processor 212 by providing it with data to perform one or more functions when device 200 switches from a low power mode to an ON mode (discussed in more detail below). SDRAM 216 may be referred to herein as processor engagement circuitry. For example, when device 200 is operating in a low power mode, SDRAM 216 may store data that may be used to "engage" processor 212 so it knows, for example, a status of device 200 and operate accordingly. In some embodiments, processor 212 and SDRAM 216 may be integrated into a single package. For example, package-on-package technology may be used to provide an integrated processor and memory package.

Display 220 may be any suitable display for displaying media, including graphics, text, and video. In some embodiments, display may be a touch screen display or an LCD. Display 220 may be driven by processor 212 or baseband circuitry 262. When driven by processor 212, a higher bit rate of data may be provided, thereby enabling the display of high resolution graphics, video, and other content to be displayed on display 220. When driven by baseband circuitry 262, a lower bit rate of data may be provided to display screen 220. The data provided by baseband circuitry 262 may be written to memory 222, which may be memory local to display 220, the contents of which are displayed on display 220. For example, content written to memory 222 and displayed on display 220 may include a clock, a signal strength indicator, and a battery power indicator. This content may be provided by processor 212 or baseband circuitry 262. Though the quantity of data may be less than that provided by processor 212, power consumption may be lower when driving display 220 with baseband circuitry 262 than when being driven by processor 212.

Figure 3:
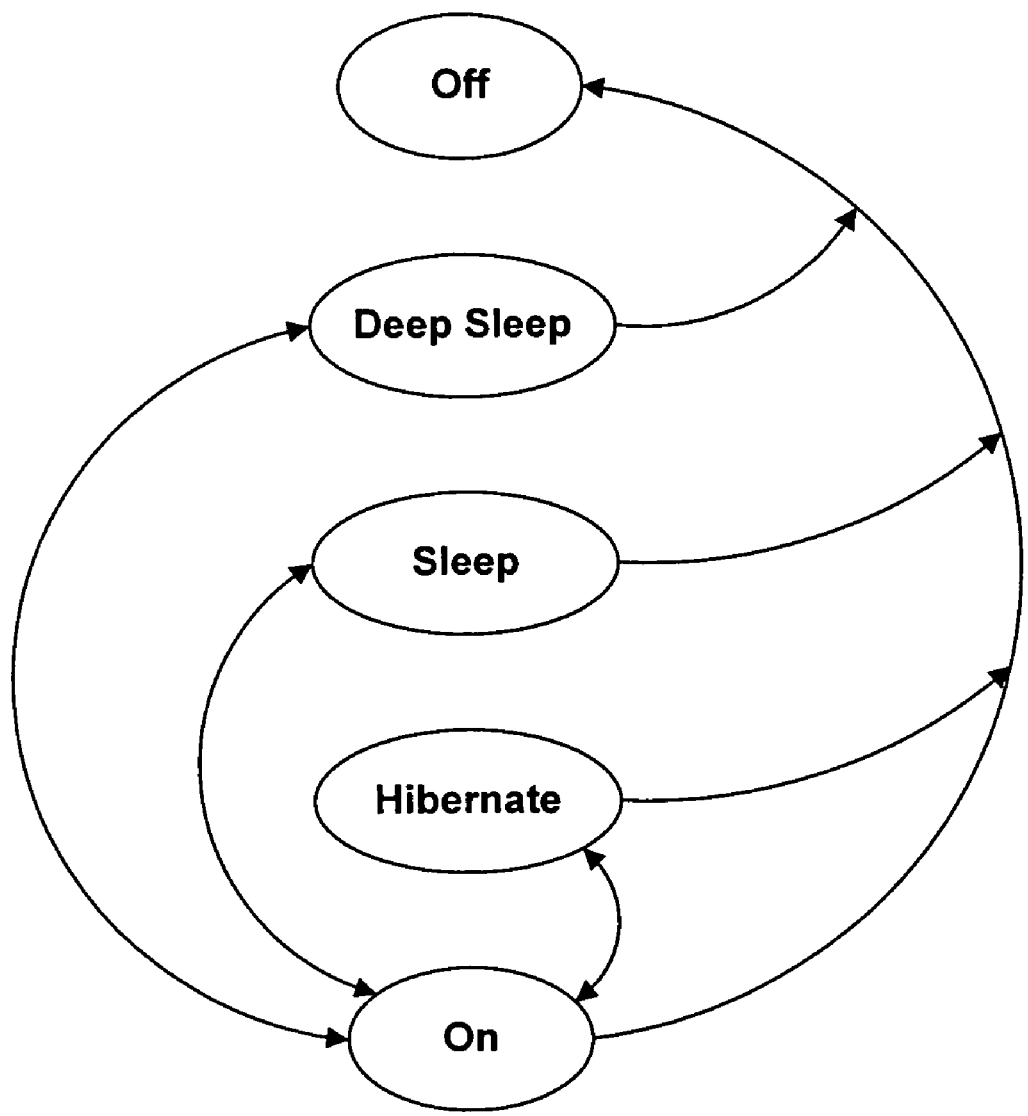
FIG. 3 shows how the application portion of a device may change states in accordance with an embodiment of the present invention.

The application portion (e.g., application portion 210) and the carrier portion (carrier portion 260) may each operate according to predetermined power modes. FIG. 3 shows that the application portion may operate according to an OFF mode, a DEEP SLEEP mode, a SLEEP mode, a HIBERNATE mode, and an ON mode in accordance with the principles of the present invention. The OFF mode may represent a state where a power source (e.g., battery) has been removed from the device. In the DEEP SLEEP mode, the power source (e.g., battery) is connected to the device, but is not powering any circuitry, except power management circuitry (e.g., circuitry 240 of FIG. 2). In the SLEEP mode, all circuitry may be powered, but the clock or clocks needed for enabling the device to execute functions are not running. In the HIBERNATE mode, the power management circuitry and the engagement processor memory (e.g., SDRAM 216 of FIG. 2) may be powered (as well as other circuitry requiring power to power the processor memory) and a clock may be provided to refresh the engagement processor memory. The other circuitry (e.g., circuitry that may be powered in the SLEEP mode) may not receive power in the HIBERNATE mode. Thus, the engagement processor memory can be maintained in a ready-to-enable processor state when the device is in a low power mode. The other low power modes may include DEEP SLEEP and SLEEP. The ON mode may represent a mode where circuitry is powered (when such power is required) and clocks are available for enabling the device to execute one or more functions.

FIG. 3 also shows how the application portion of the device may change between states. As shown, the ON, HIBERNATE, SLEEP, and DEEP SLEEP modes may all switch to the OFF mode. The application portion may switch between the ON and DEEP SLEEP modes, between the ON and SLEEP modes, and the ON and HIBERNATE modes. The application portion may be able to switch between different modes not specifically shown in FIG. 3. For example, the application portion may be able to switch between the HIBERNATE and SLEEP modes.

The carrier portion (e.g., carrier portion 260) may operate according to an OFF mode, a SLEEP mode, and an ON mode. The OFF mode may occur when a power source (e.g., a battery) is not connected to the device. In the SLEEP mode (also the low power mode of the carrier circuitry), the carrier circuitry may be powered, but is in a minimally active state.

Figure 4:
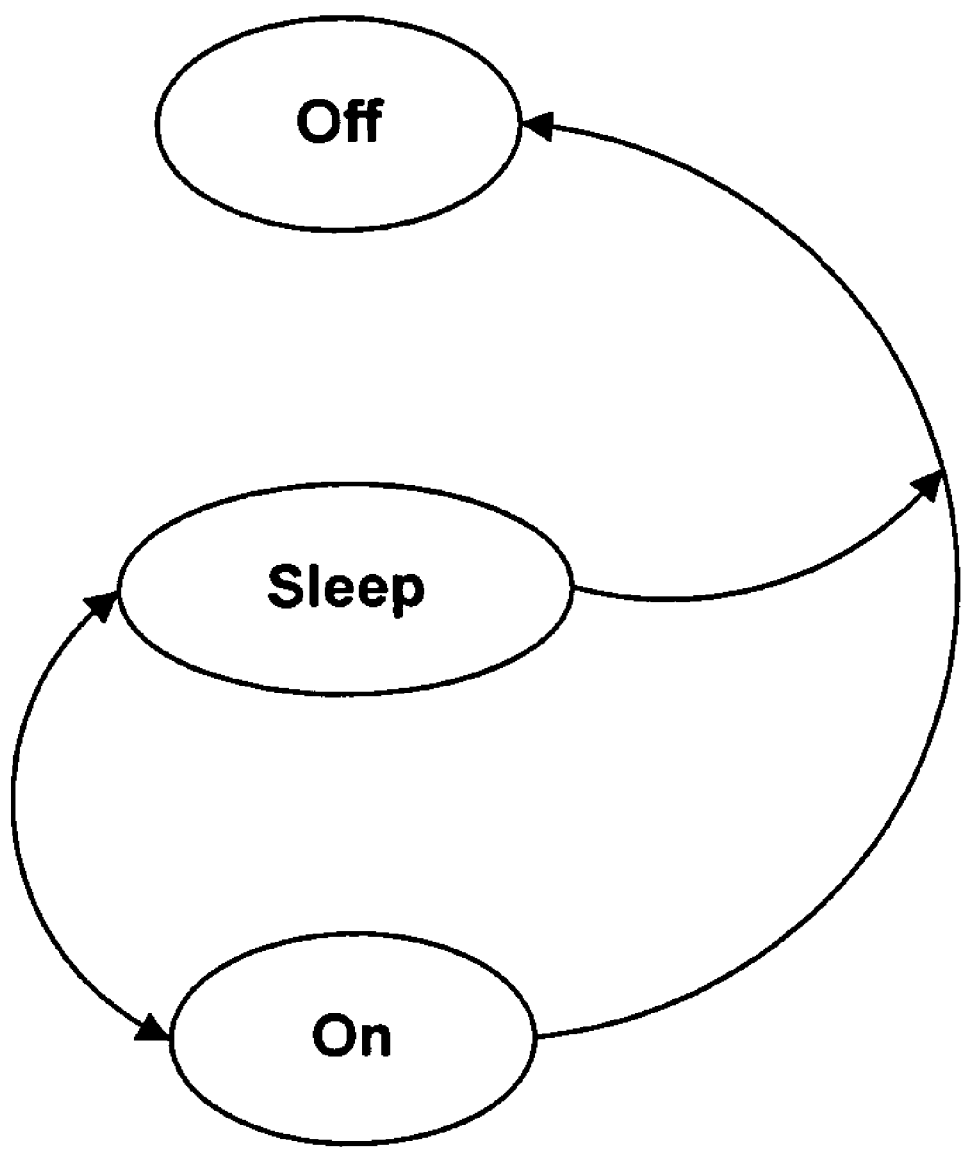
FIG. 4 shows how the carrier portion of a device may change states in accordance with an embodiment of the present invention.

That is power may be provided, but no functions are being performed. In the ON mode, one or more carrier portion functions may be executed. FIG. 4 also shows how the carrier portion of the device may change between states. As shown, the ON and SLEEP modes may all switch to the OFF mode. The carrier portion may switch between the ON and SLEEP modes Power management according to the invention may coordinate power management across both portions of the device. This provides extra flexibility in managing power consumption. For example, independent mode control may be exercised for the application portion and the carrier portion. That is, when the application portion is operating in a particular mode (e.g., ON mode), the power management circuitry may select one of several available modes (e.g., OFF, SLEEP, and ON) for the carrier circuitry. The available modes may depend on the operating mode of the application portion. A power management mode coordination table for the application and carrier portions is illustrated in FIG. 5.

FIG. 5 shows the three power management modes of the carrier portion along the y-axis of the table and the five power modes of the application portion along the x-axis of the table. The checkmarks indicate that both application and carrier portions may exist in the power modes defined by the x and y coordinates of a box. The "X's" indicate where the power modes defined by the box at a particular x and y coordinate may not exist both application and carrier portions. For example, both the application and carrier portions may simultaneously exist in OFF modes. However, the carrier portion may not operate in an ON mode when the application portion is operating in an OFF mode.

In one embodiment, the power management circuitry may operate the device in a low power mode (e.g., a HIBERNATION mode), but enable the device to quickly become fully operational in response to a power-ON event (e.g., an event that causes the device to switch from a low power mode to an ON mode), despite having been in that low power mode. To provide the combined benefit of both low power consumption and quick operational readiness, a processor engaging memory (e.g., SDRAM) may be powered ON while other circuitry in the application portion and the carrier portion are powered OFF. By keeping the processor engaging memory powered ON, a time delay in powering up that memory is avoided when the device switches from a low power mode to an ON mode, thereby enabling the memory to substantially immediately load its contents into the processor. When the processor receives the memory contents, the device may be fully operational.

Figure 6:
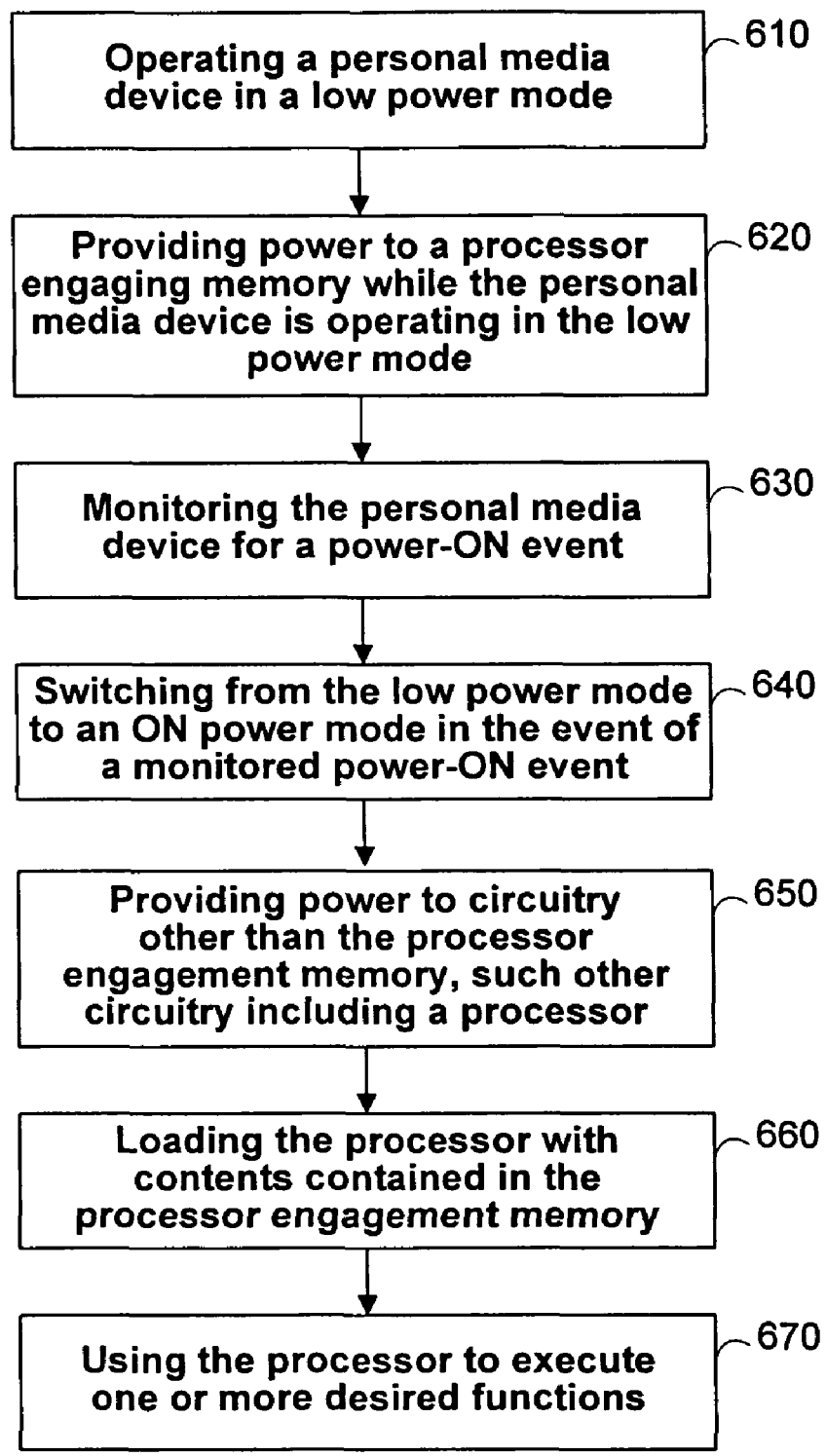
FIG. 6 is a flowchart illustrating steps of a power management scheme according to an embodiment of the present invention the invention.

FIG. 6 is an illustrative flowchart showing various steps of a power management scheme according to the invention. At step 610, a device may operate in a low power mode. For example, the application portion of the device may be operating in the HIBERNATION mode. At step 620, power may be provided to a processor engaging memory while the device is operating in the low power mode. For example, in a HIBERNATION mode, the processor engaging memory may be provided with power and refreshed with clocks while other circuitry, such as the processor, may not be supplied with power.

At step 630, the device can be monitored for a power-ON event. A power-ON event may be any event that causes the device to switch from one power mode to another. For example, a power-ON event may occur when the user uses an interface of the device (e.g., to change the volume) or when a telephone call or text message is received. Briefly referring to FIG. 2, a power-ON event may be received at input 242 at power management circuitry 240. In response to receiving the power-ON event, the power management circuitry may switch the device from the low power mode to the ON power mode, as indicated by step 640.

When the device is operating in an ON power mode, power may be provided to circuitry other than the processor engaging memory, such other circuitry may include a processor, as indicated at step 650. At step 660, the contents of the processor engaging memory may be loaded into the processor. Assuming that the device is switching from a HIBERNATION mode to an ON mode, the processor engaging memory is "active" and ready to substantially immediately supply the processor with its contents to enable the processor to execute one or more desired functions, as indicated at step 670.

It is understood that the steps shown in FIG. 6 are merely illustrative and that existing steps may be modified, added or omitted.

Figure 7:
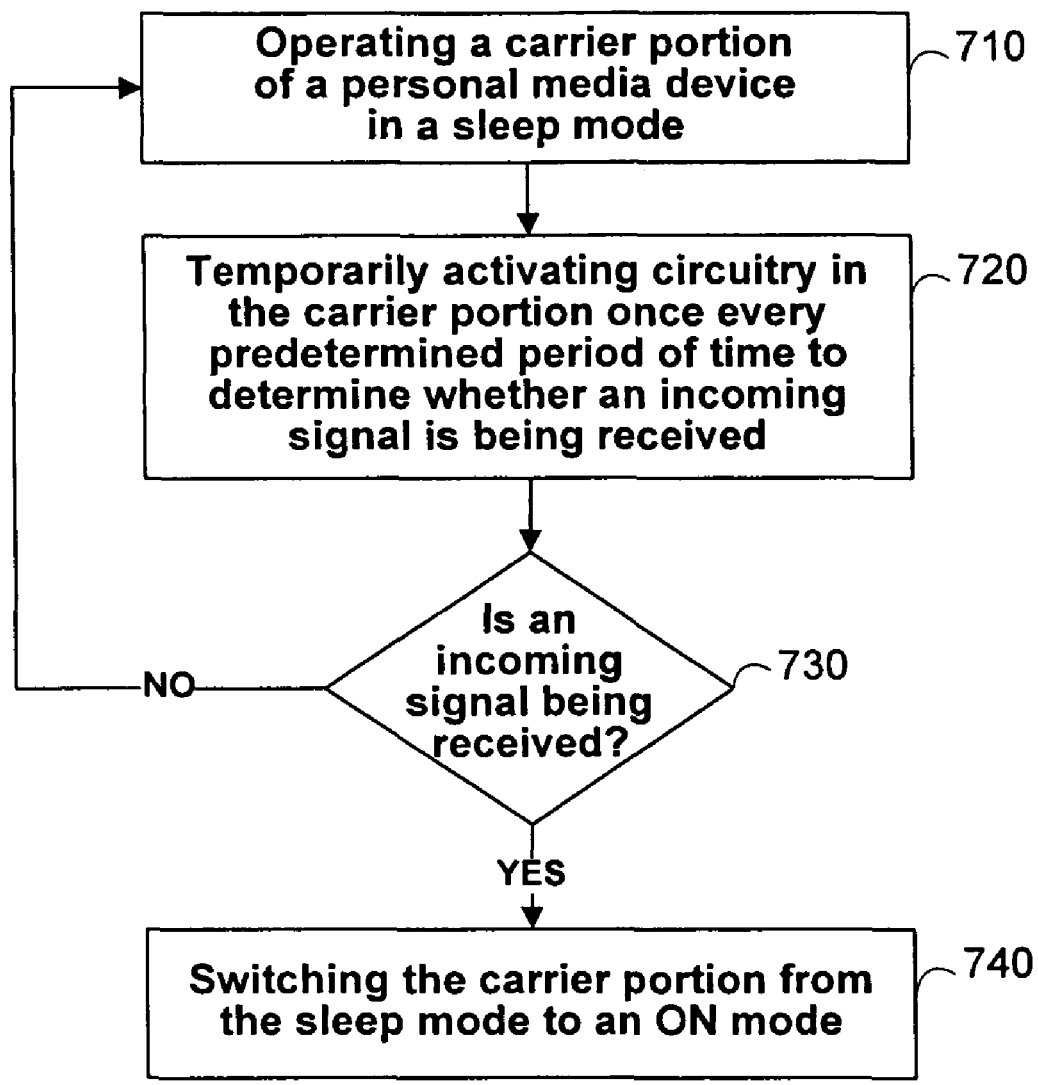
FIG. 7 is a flowchart illustrating steps of another power management scheme according to an embodiment of the present invention the invention.

FIG. 7 is an illustrative flowchart showing various steps of another power management scheme according to the invention. This flowchart refers to a power management scheme of the carrier portion. Starting at step 710, the carrier portion of a personal device can be operating in a SLEEP mode. At step 720, the carrier portion (or at least a portion of the carrier portion) is temporarily activated once every predetermined period of time to determine whether an incoming signal is being received. The incoming signal may be, for example, a telephone call or a text message. Note that based on the coordination table of FIG. 5, the carrier portion may not be temporarily operated in the ON mode as that may require the application portion to switch to an ON mode. Thus, when the carrier portion is temporarily activated, the activated portion may operate while the carrier portion is operating in the SLEEP mode.

A determination may be made as to whether an incoming signal is being received at step 730. This determination may be made while the carrier portion is temporarily activated. If no incoming signal is being received, the process may revert to step 710, where the carrier portion returns to operate in a SLEEP power mode. If an incoming signal is being received, the process may proceed to step 740, where the carrier portion is switched from the SLEEP mode to the ON mode.

It is understood that the steps shown in FIG. 7 are merely illustrative and that existing steps may be modified, added or omitted. For example, a step may be added to show that the application portion may be switched to an ON mode if it is not already in that mode. The application portion may have to be in the ON mode when the carrier portion is in the ON mode, as required by the coordination table of FIG. 5.

Power management according to the invention may be used to control how content is displayed on a display screen of the device. For example, when the application portion is operating in an ON mode, the processor may drive the display. However, when the application portion is operating in a low power mode, the carrier portion may drive the display. The carrier portion, while in the SLEEP mode, may write data to memory local to the display (e.g., memory 222 of FIG. 2). The data stored in the local memory may then be displayed on the display. Power savings may be realized using the carrier portion to drive the display when the device is operating in a low power mode because the carrier portion does not require processor activation, which may require more power than the carrier portion to drive the display.

Figure 8:
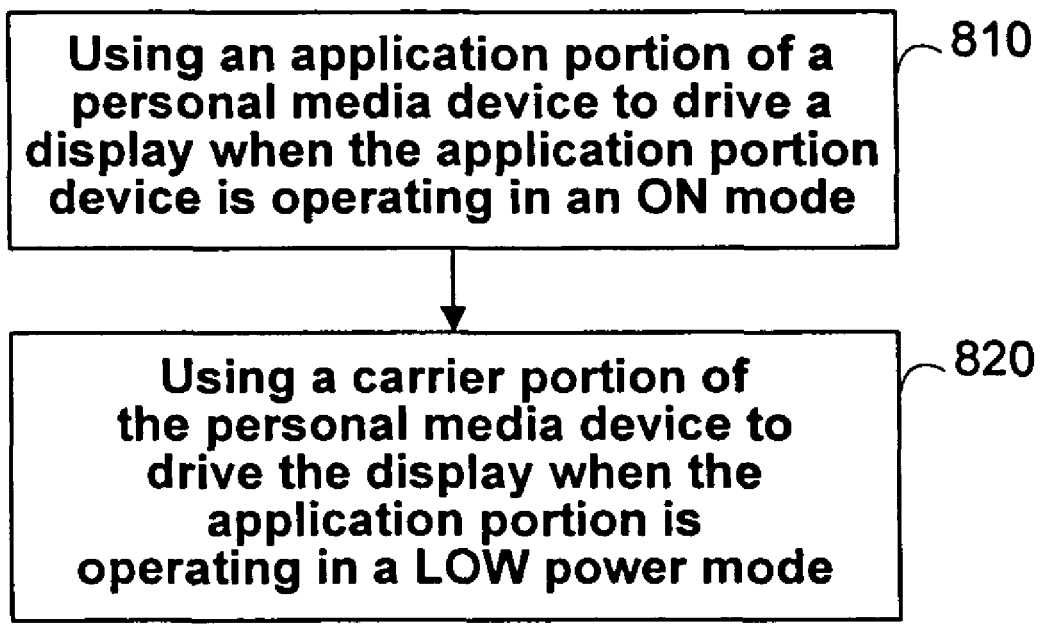
FIG. 8 is a flowchart of a power management scheme involving a display in accordance with an embodiment of the present invention.

FIG. 8 is a flowchart of a power management scheme involving a display in accordance with the principles of the present invention. Starting at step 810, the application portion of the device may drive a display when the application portion is operating in an ON mode. For example, the processor (e.g., processor 212 of FIG. 2) may drive the display when the application portion is operating in the ON mode. Referring to FIG. 2, processor 212 may drive display 220 by providing data over path 232 and/or the combination of path 234 and multiplexor 236. Data provided to multiplex 236, regardless of whether it is provided by processor 212 or carrier portion 260, may be written to memory 222.

The carrier portion of the device may be used to drive the display when the application portion is operating in a low power mode, as indicated in step 820. For example, when the application portion switches from the ON mode to one of the HIBERNATE or SLEEP modes (based on the coordination table of FIG. 5), the carrier circuitry may drive the display. Referring to FIG. 2, baseband circuitry 262 may provide data over path 237 to multiplexor 236, which provides the data to memory 222 of display 220. It is understood that although it may be preferable for the application processor to drive the memory driven portion of the display when operating in the ON mode, the carrier portion may drive the memory driven portion of the display when the application portion is operating in the ON mode.

It is understood that the steps shown in FIG. 8 are merely illustrative and that existing steps may be modified, added or omitted.

Figure 9:
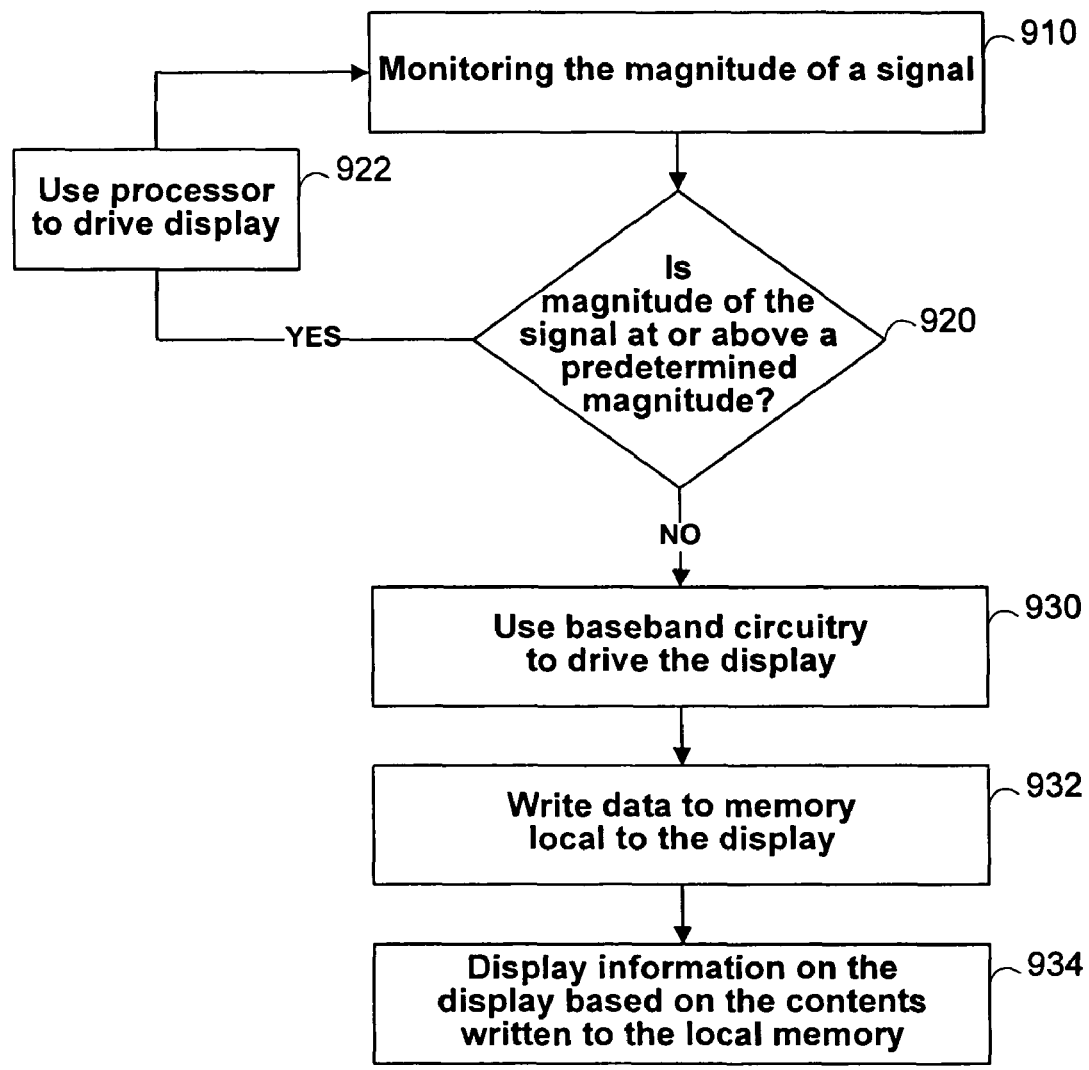
FIG. 9 is a flowchart of another of power management scheme involving a display in accordance with an embodiment of the present invention.

FIG. 9 is a flowchart showing another of power management scheme involving a display in accordance with the principles of the present invention. Starting at step 910, the magnitude of a signal can be monitored. The signal may be power signal provided to the processor of the application portion of the device. When the application portion is operating in the ON mode, the voltage provided to the processor may be at, or above, a predetermined voltage level. At step 920, a determination is made if the magnitude of the signal is at, or above, a predetermined magnitude. If yes, then the processor may be used to drive the display, as indicated at step 922. If no, then the process proceeds to step 930, where the baseband circuitry may be used to drive the display. For example, as long as the magnitude of the signal is at or above the predetermined magnitude, a multiplexor (e.g., multiplexor 236) may receive a selection input (e.g., input 238 to transmit data received from the processor. When the magnitude of the signal drops below the predetermined magnitude, the multiplexor input signal may be set to transmit data received by the baseband circuitry.

The data received by the baseband circuitry may be written to the memory local to the display, as specified in step 932. At step 934, information based on the contents stored in the memory local to the display may be displayed.

It is understood that the steps shown in FIG. 9 are merely illustrative and that existing steps may be modified, added or omitted.

Figure 10:
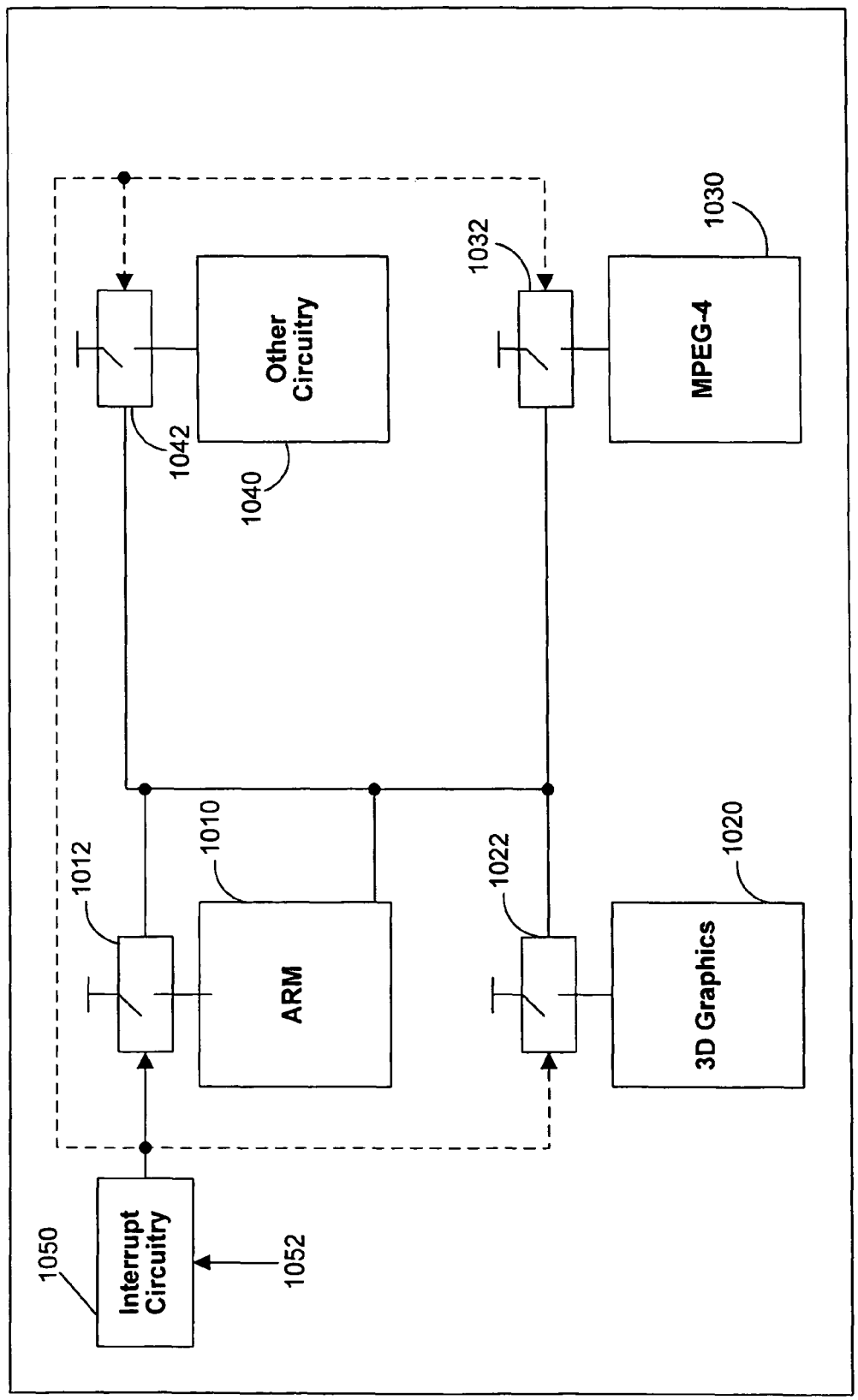
FIG. 10 shows a simplified block diagram for implementing a power management to reduce power consumption when a device is operating in an ON mode in accordance with an embodiment of the present invention.

FIG. 10 shows an illustrative simplified block diagram for implementing a power management to reduce power consumption when the device is operating in an ON mode in accordance with the principles of the present invention. FIG. 10 may include discrete circuitry portions 1010, 1020, 1030, and 1040, each of which have an associated switch 1012, 1022, 1032, and 1042 operative to electrically couple or decouple its associated circuitry portion to a power source. Discrete circuitry portions 1010, 1020, 1030, and 1040 may be discrete in that they may be selectively powered ON and OFF independent of each other. In addition, they may be discrete in that they may each perform specific functions. For example, portion 1010 may be a processor such as an ARM processor, portion 1020 may perform render 3D graphics, portion 1030 may handle MPEG-4 protocols, and portion 1040 may perform a function associated with other circuitry. Note that additional discrete portions may be provided, but have been omitted to avoid overcrowding the drawing. Discrete portions may be included only in the application portion, may be included only in the carrier portion, or may be included in both the application and carrier portions.

The discrete circuitry portions are selectively turned ON and OFF, depending, for example, on whether a particular discrete circuitry portion is idle or its processing functionality is not needed. The discrete circuitry portions may be turned ON and OFF by electrically coupling and de-coupling the circuitry portion to a power supply via a controlled switch (e.g., switches 1012, 1022, 1032, and 1042). When a discrete circuitry portion is not needed, the supply of power is cut off, thereby preventing power loss caused by leakage current.

The switch may be controlled by interrupt control circuitry 1030 and/or by the processor portion 1010. Interrupt control circuitry 1050 may be operative to cause switch 1012 to close, thereby electrically coupling processor 1010 to the power supply. When processor 1010 is turned OFF and processor 1010 is needed to perform a function, interrupt circuitry 1050 may cause switch 1012 to close to enable power to be delivered to processor 1010. Interrupt circuitry 1050 may be responsive to signals received at input 1052.

Interrupt circuitry is shown coupled to switch 1012, but it may optionally be coupled to switches 1022, 1032, and 1042. In the latter coupling arrangement, an interrupt signal provided by circuitry 1050 may cause each portion to be electrically coupled to the power supply.

When the processor is ON, it may monitor itself and other discrete circuitry portions 1020, 1030, and 1040 to determine whether to turn those portions OFF. If the discrete circuitry portion is not needed (e.g., idling), processor 1010 may provide an instruction that causes a switch associated with that portion to electrically de-couple the supplied power from that portion. For example, if processor 1010 determines that portion 1020 is not needed, it may provide an instruction that causes switch 1022 to open. In addition, processor 1010 may provide instructions to cause a switch to electrically couple a discrete circuitry portion to the power supply. For example, processor may provide an instruction to switch 1032 to close so that portion 1030 is electrically coupled to the power supply.

Figure 11:
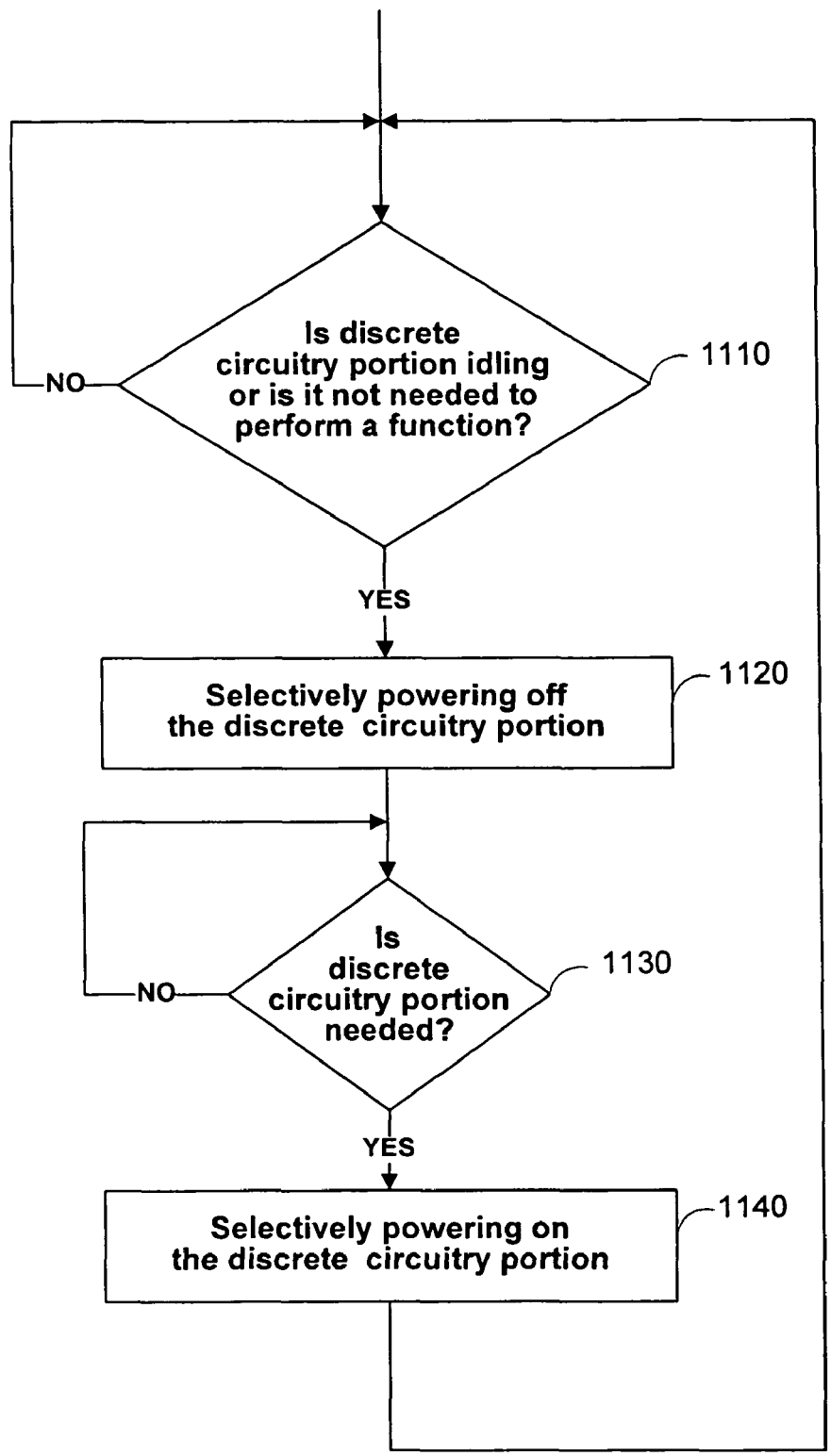
FIG. 11 is a flowchart for implementing power management to reduce power consumption when the a device is operating in an ON mode in accordance with an embodiment of the present invention.

FIG. 11 is a flowchart for implementing power management to reduce power consumption when the device is operating in an ON mode in accordance with the principles of the present invention. Starting at step 1110, a determination is made whether a discrete circuitry portion is idling or no longer needed. The processor may know that a particular discrete portion is no longer needed after a certain instruction set is carried out by that discrete portion. Therefore, it may provide an instruction, for example, at the end of the instruction set being sent to that portion to selectively power off that discrete portion OFF. A discrete portion may be deemed idle if it does not perform a function for at least a predetermined period of time. If at step 1110, the determination is no, the process may return to the beginning of step 1110. If at step 1110, the determination is yes, the process may proceed to step 1120, where that discrete portion is selectively powered OFF.

At step 1130, a determination is made whether the discrete portion is needed, for example, to perform a function. If no, then the process returns to the beginning of step 1130. If yes, then the process proceeds to step 1140, where that discrete circuitry portion is selectively powered ON.

Figure 12:
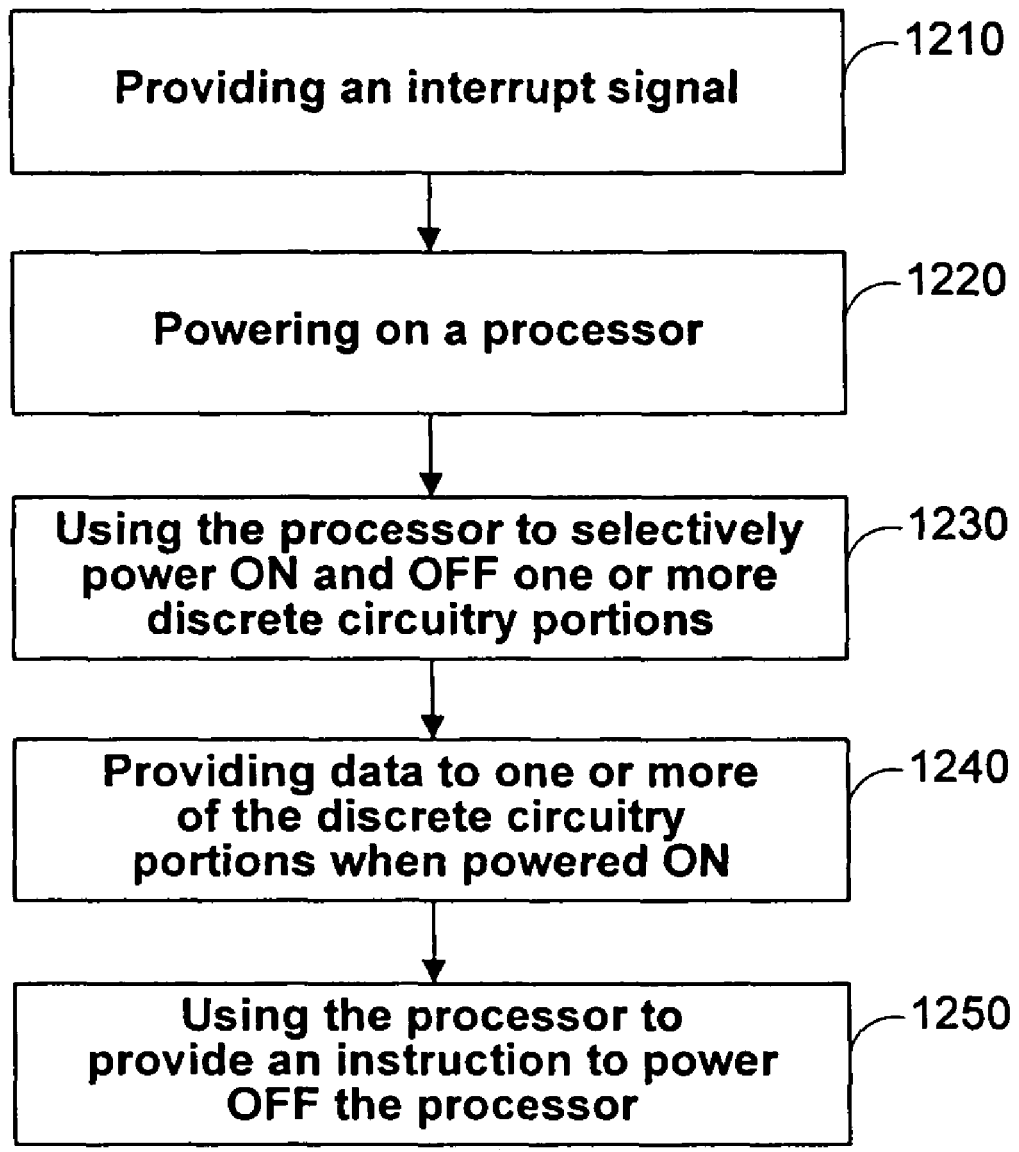
FIG. 12 is another flowchart for implementing power management to reduce power consumption when the media device is operating in an ON mode in accordance with an embodiment of the present invention.

FIG. 12 is another flowchart for implementing power management to reduce power consumption when the device is operating in an ON mode in accordance with the principles of the present invention. Starting at step 1210, an interrupt is provided. At step 1220, a processor may be powered ON. For example, the interrupt control circuitry may provide a signal to a switch (e.g., switch 1012) that electrically couples the processor to a power source. At step 1230, the processor may be used to selectively power ON and OFF one or more discrete circuitry portions. These discrete portions may be portions other than the processor. At step 1240, data may be provided to one or more of the discrete portions when powered ON. In this step, the discrete portions may include the processor. At step 1250, the processor may provide an instruction to power OFF the processor.

Figure 13:
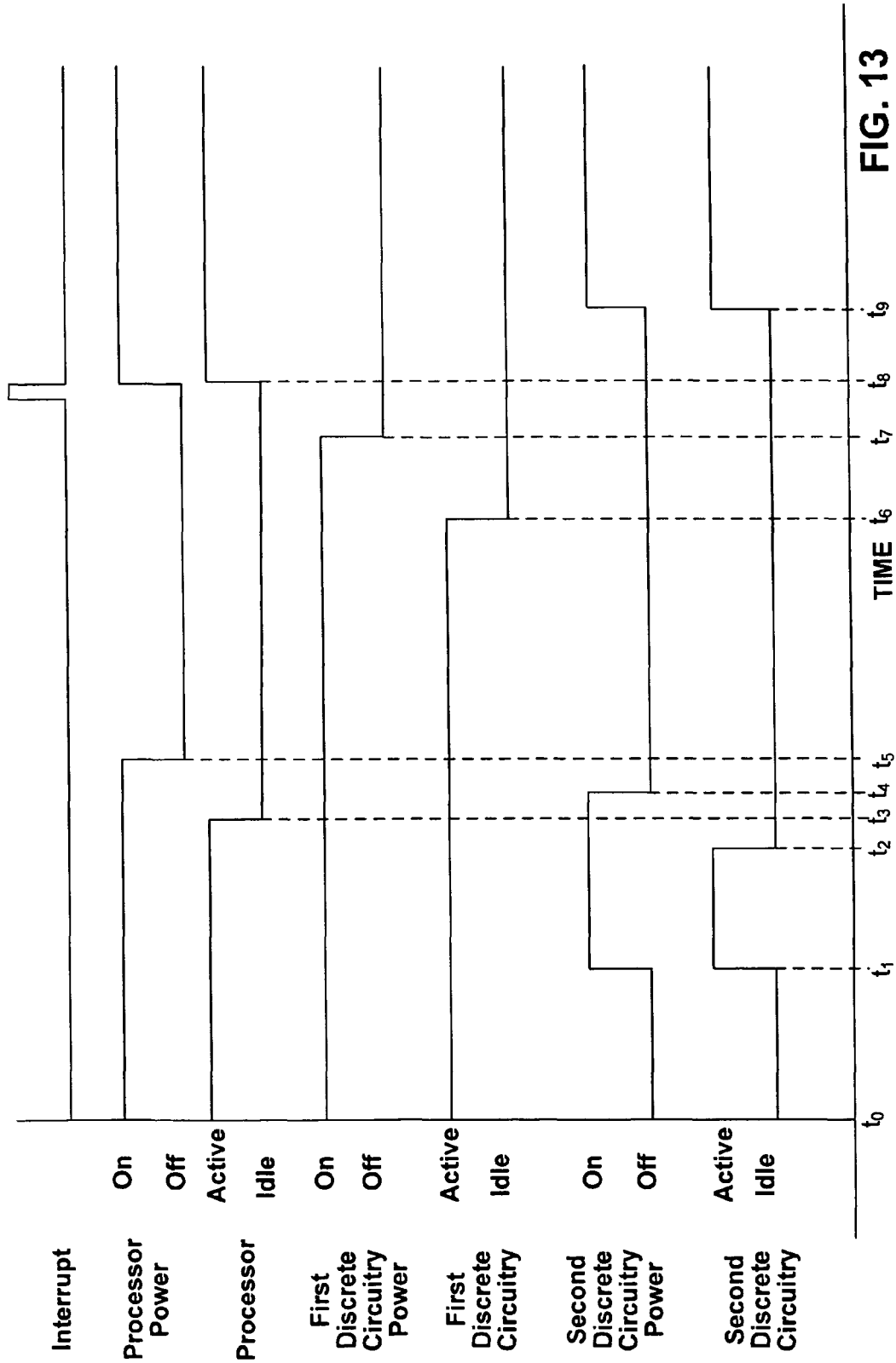
FIG. 13 is an illustrative timing diagram showing the ON/OFF states and Active/Idle states of a processor and first and second discrete circuitry in accordance with an embodiment of the present invention.

FIG. 13 is an exemplary timing diagram showing the ON/OFF states and Active/Idle states of a processor and first and second discrete circuitry. At time $t_0$, the processor and first discrete circuitry can be powered ON and active, whereas the second discrete circuitry can be powered OFF and idle. At time $t_1$, the second discrete circuitry can be powered ON and active in response to receiving power ON instruction from the processor. Then, at time after $t_2$, but before time $t_3$, the processor may detect that the second circuitry is idle and provide a power OFF instruction to turn second circuitry OFF. That turn-OFF instruction may be provided prior to time $t_3$, at which point the process goes idle. The turn-OFF instruction may be processed at time $t_4$, at which point the second circuitry is no longer provided with power. Even though the process turn OFF instruction is received after the process is no longer active, the turn-OFF instruction may be registered, thereby enabling processor instructions to be carried out after the processor has entered an idle state or powered OFF.

At time $t_5$, the processor may be powered OFF in response to a monitored idle event. An example where registered processor instructions can turn OFF circuitry after the processor has been powered OFF is shown at time $t_7$, where first circuitry is powered OFF. Time $t_6$ is when first circuitry switches from active to idle. At time $t_8$, an interrupt signal is provided, which causes processor to be turned ON and rendered active. The processor may then provide commands to power up other discrete circuitry such as second circuitry at time $t_9$.

Figure 14:
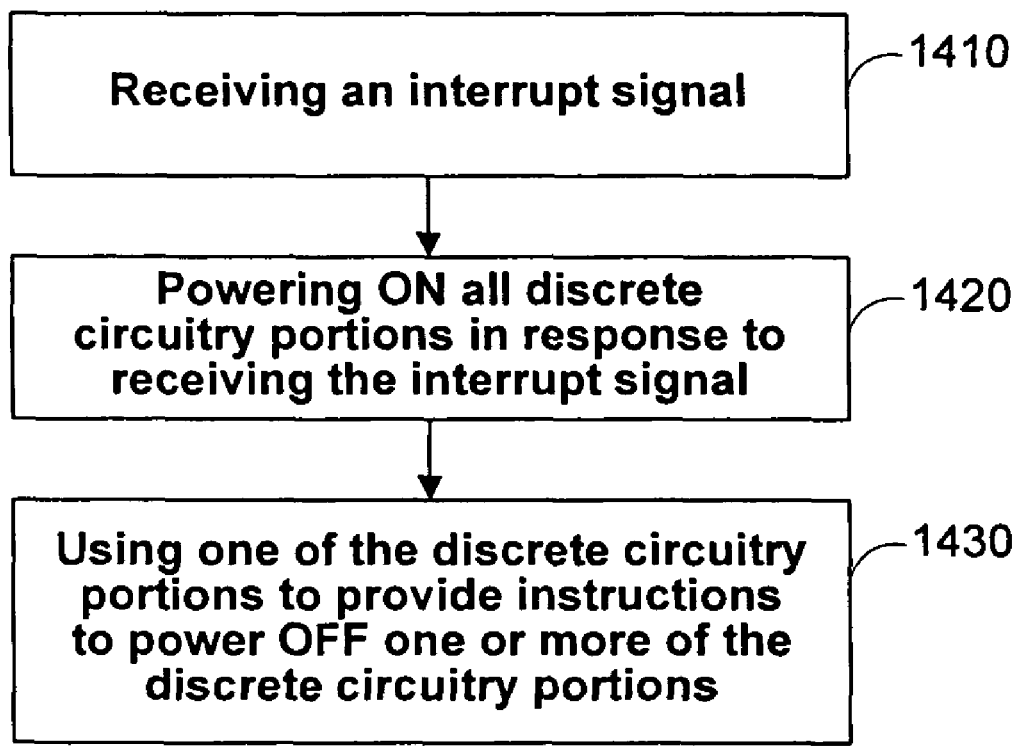
FIG. 14 is yet another flowchart for implementing power management to reduce power consumption when a device is operating in an ON mode in accordance with an embodiment of the present invention.

FIG. 14 is another flowchart for illustrative implementing power management to reduce power consumption when the device is operating in an ON mode in accordance with the principles of the present invention. Starting at step 1410, an interrupt signal can be provided. This interrupt signal may result in powering ON all discrete circuitry portions, as indicated at step 1420. This is illustrated in the timing diagram of FIG. 15. As shown, at time $t_0$, the processor and first through third discrete circuitry can be powered OFF. At time $t_1$, an interrupt signal can be provided, which results in the processor and the first through third circuitry to be powered ON at time $t_2$.

Referring back to FIG. 14, at step 1430 one of the discrete circuitry portions (e.g., the processor) may be used to provide instructions to power OFF one or more discrete circuitry portions. For example, in FIG. 15, second circuitry can be powered OFF at time $t_3$, and third circuitry can be powered OFF at time $t_4$. At time $t_5$, third circuitry may powered back ON. At time $t_5$, the first circuitry may be powered OFF. Then at time $t_6$, the processor may be powered OFF.

Thus it is seen that systems and methods managing power are provided. It is understood that the steps shown in the flowcharts discussed above are merely illustrative and that existing steps may be modified, added or omitted. Those skilled in the art will appreciate that the invention can be practiced by other than the described embodiments, which are presented for purposes of illustration rather than of limitation, and the invention is limited only by the claims which follow.

What is claimed is:

1. A method for driving a display of a portable electronic device comprising an application portion and a carrier portion, the method comprising:
using the application portion to drive the display when the application portion is operating in an ON power mode, wherein using the application portion to drive the display when the application portion is operating in the ON power mode comprises providing data at a first bit rate from the application portion to the display; and
using the carrier portion to drive at least a portion of the display when the application portion is operating in a low power mode, wherein using the carrier portion to drive at least the portion of the display when the application portion is operating in the low power mode comprises providing data at a second bit rate from the carrier portion to the display and wherein the first bit rate is greater than the second bit rate.

2. The method of claim 1, further comprising:
monitoring the magnitude of a signal provided to predetermined circuitry in the application portion to determine whether to use the application portion or the carrier portion to drive the display.

3. The method of claim 2, wherein the signal is a voltage signal and the predetermined circuitry is a processor.

4. A portable electronic device comprising:
an application processor;
baseband circuitry; and
a display electrically coupled to the application processor and the baseband circuitry, wherein the display is operable to receive data from the application processor when the application processor is operating in an ON power mode and is operable to receive data from the baseband circuitry when the application processor is operating in a low power mode, wherein the display comprises a memory, wherein data stored in the memory is used to display content on the display, and wherein, when the baseband circuitry is operating in a SLEEP mode, the baseband circuitry periodically activates and provides data to the memory.

5. The device of claim 4, further comprising:
selection circuitry for selecting whether the application processor or the baseband circuitry drives the display.

6. The device of claim 4, wherein the device is a mobile telephone.

* * * * *